(12) United States Patent
Wang (10) Patent No.: US 12,022,018 B2
(45) Date of Patent: Jun. 25, 2024

(54) FOLDABLE DISPLAY DEVICE

(71) Applicant: Wuhan China Star Optoelectronics Semiconductor Display Technology Co., Ltd., Wuhan (CN)

(72) Inventor: Wenqiang Wang, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/618,511

(22) PCT Filed: Nov. 1, 2021

(86) PCT No.: PCT/CN2021/127832
§ 371 (c)(1),
(2) Date: Dec. 13, 2021

(87) PCT Pub. No.: WO2023/050518
PCT Pub. Date: Apr. 6, 2023

(65) Prior Publication Data
US 2024/0040025 A1    Feb. 1, 2024

(30) Foreign Application Priority Data

Sep. 29, 2021    (CN) .......................... 202111152379.4

(51) Int. Cl.
*H04M 1/02*    (2006.01)
(52) U.S. Cl.
CPC ....... *H04M 1/0268* (2013.01); *H04M 1/0214* (2013.01)

(58) Field of Classification Search
CPC .. H04M 1/0268; H04M 1/0214; G06F 1/1641
USPC .......................................................... 345/156
See application file for complete search history.

(56) References Cited

U.S. PATENT DOCUMENTS

| | | | | |
|---|---|---|---|---|
| 2018/0192527 | A1* | 7/2018 | Yun | G09F 9/301 |
| 2020/0352045 | A1* | 11/2020 | Wang | H05K 5/0226 |
| 2021/0150944 | A1* | 5/2021 | Yoon | G06F 1/1618 |

FOREIGN PATENT DOCUMENTS

| | | |
|---|---|---|
| CN | 109004001 A | 12/2018 |
| CN | 109918165 A | 6/2019 |
| CN | 111754865 A | 10/2020 |
| CN | 112263059 A | 1/2021 |

(Continued)

*Primary Examiner* — Calvin C Ma
(74) *Attorney, Agent, or Firm* — Nathan & Associates; Menachem Nathan (57) ABSTRACT

Disclosed is a foldable display device. The foldable display device includes: a first folding rack, a second folding rack and a flexible display panel. The second folding rack is pivotally connected with the first folding rack. The flexible display panel is arranged on one side of the first folding rack and the second folding rack, and one end of the flexible display panel wraps around an end of the first folding rack away from the second folding rack, and extends to cover the other side of the first folding rack. The flexible display panel comprises a first static bending zone and a dynamic bending zone, and the first static bending zone covers the end of the first folding rack away from the second folding rack; the dynamic bending zone covers a pivotal position between the first folding rack and the second folding rack.

20 Claims, 10 Drawing Sheets

(56) References Cited

FOREIGN PATENT DOCUMENTS

| CN | 112509466 A | 3/2021 |
|---|---|---|
| CN | 113241007 A | 8/2021 |

\* cited by examiner

FOLDABLE DISPLAY DEVICE

FIELD OF THE INVENTION

The present application relates to a display technology field, and more particularly to a foldable display device that integrates a main screen and a secondary screen.

BACKGROUND OF THE INVENTION

In recent years, flexible organic light emitting diode (OLED) display technology has promoted the development of new mobile phones. Relying on flexible OLED technology, major OEMs of mobile phone and computer have successively provided foldable mobile phones, foldable computers and other products, achieving new breakthroughs in display modalities. Foldable mobile phones and foldable computers are the main focus of the mobile phone consumer market, recently. Flexible display technology will be the mainstream trend of the display terminal market in the future.

At present, terminal manufacturers have successively introduced inward-folding mobile phones and outward-folding mobile phones. These kinds of products are favored by consumers. Since the inward-folding mobile phone possesses a small appearance and volume, it can better protect the screen after being folded and stored, and is convenient to carry. Therefore, the market share of the inward-folding mobile phone possesses an obvious advantage.

Generally, in order to facilitate the user to realize multi-screen interactive use, the inward-folding mobile phone can realize the application effect of the direct showing screen through the outward secondary screen without unfolding the inward-folding screen. However, such overall design for mobile phone requires adopting two independent screens to achieve this use function. In addition, due to the use of an independent secondary screen, the secondary screen of the conventional technology will also have the problem of inconsistent aspect ratio display.

Meanwhile, the research and development cost of foldable screen is often high. The mobile phone adopts two independent screens at the same time, and the cost will inevitably remain high. As a result, the market for foldable mobile phones is currently difficult to achieve the expected sales volume. Therefore, how to reduce costs and remain the application advantages of foldable mobile phones is an urgent technical problem to be solved.

The existing foldable display device has technical problems of inconsistent aspect ratio and high cost when two independent screens are adopted.

SUMMARY OF THE INVENTION

To solve the aforesaid problem, the present application provides a foldable display device.

The foldable display device provided by the present application comprises: a first folding rack, a second folding rack and a flexible display panel. The second folding rack is pivotally connected with the first folding rack. The flexible display panel is arranged on one side of the first folding rack and the second folding rack, and one end of the flexible display panel wraps around an end of the first folding rack away from the second folding rack, and extends to cover an other side of the first folding rack. wherein the flexible display panel comprises a first static bending zone and a dynamic bending zone, and the first static bending zone is arranged corresponding to the end of the first folding rack away from the second folding rack; the dynamic bending zone is arranged to cover a pivotal position between the first folding rack and the second folding rack.

In one embodiment of the present application, the first static bending zone of the flexible display panel is fixedly connected to the end of the first folding rack away from the second folding rack.

In one embodiment of the present application, the foldable display device further comprises a supporting plate. The supporting plate comprises a bending structure, and the supporting plate is arranged between a side of the first folding rack and the second folding rack and the flexible display panel.

In one embodiment of the present application, the foldable display device further comprises an adhesive layer arranged on the supporting plate, the end of the first folding rack away from the second folding rack and the other side of the first folding rack. The flexible display panel is adhered on the adhesive layer.

In one embodiment of the present application, the flexible display panel comprises a first non-bending zone, a second non-bending zone and a third non-bending zone; the first non-bending zone and the second non-bending zone cover the one side of the first folding rack and the second folding rack, and the third non-bending zone extends to cover the other side of the first folding rack.

In one embodiment of the present application, the first non-bending zone is fixedly connected to one side of the first folding rack, and the second non-bending zone is fixedly connected to one side of the second folding rack, and there is a gap on one side of the pivotal position between the dynamic bending zone and the first folding rack and the second folding rack.

In one embodiment of the present application, the flexible display panel comprises a fourth non-bending zone and a second static bending zone, and the fourth non-bending zone extends to cover an other side of the second folding rack, and the second static bending zone is located between the second non-bending zone and the fourth non-bending zone, and the second static bending zone wraps around an end of the second folding rack away from the first folding rack.

In one embodiment of the present application, the foldable display device comprises a control module.

In one embodiment of the present application, the flexible display panel comprises a terminal bending zone, and the terminal bending zone is located at an end of the third non-bending zone away from the first non-bending zone or at an end of the second non-bending zone away from the first non-bending zone, and the control module is arranged in the terminal bending zone.

In one embodiment of the present application, after the first folding rack and the second folding rack are folded, the control module activates a part of the flexible display panel arranged on the other side of the first folding rack to display, and the control module deactivates a part of the flexible display panel arranged on the one side of the first folding rack and the second folding rack; after the first folding rack and the second folding rack are unfolded, the control module deactivates the part of the flexible display panel arranged on the other side of the first folding rack, and the control module activates the part of the flexible display panel arranged on the one side of the first folding rack and the second folding rack to display.

In one embodiment of the present application, the control module controls the first non-bending zone, the second non-bending zone, the dynamic bending zone, the third non-bending zone and the first static bending zone to perform dynamic display or static display.

In one embodiment of the present application, the first non-bending zone, the second non-bending zone and the dynamic bending zone are dynamic display zones for displaying pictures; the third non-bending zone and the first static bending zone are static display zones for displaying time or numbers.

In one embodiment of the present application, a part of the flexible display panel arranged on the one side of the first folding rack and the second folding rack is a dynamic display zone, and a part of the flexible display panel arranged on the other side of the first folding rack is a static display zone.

The present application further provides a foldable display device, comprising: a first folding rack, a second folding rack, a flexible display panel and a supporting plate. The second folding rack is pivotally connected with the first folding rack. The flexible display panel is arranged on one side of the first folding rack and the second folding rack, and one end of the flexible display panel wraps around an end of the first folding rack away from the second folding rack, and extends to cover an other side of the first folding rack. wherein the flexible display panel comprises a first static bending zone and a dynamic bending zone, and the first static bending zone is arranged corresponding to the end of the first folding rack away from the second folding rack; the dynamic bending zone is arranged to cover a pivotal position between the first folding rack and the second folding rack. The supporting plate comprises a bending structure corresponding to the dynamic bending zone of the flexible display panel, and the supporting plate is arranged on a side of the flexible display panel close to the first folding rack and the second folding rack, and is fixedly connected to the flexible display panel.

In one embodiment of the present application, the first static bending zone of the flexible display panel is fixedly connected to the end of the first folding rack away from the second folding rack.

In one embodiment of the present application, the flexible display panel comprises a first non-bending zone, a second non-bending zone and a third non-bending zone; the first non-bending zone and the second non-bending zone cover the one side of the first folding rack and the second folding rack, and the third non-bending zone extends to cover the other side of the first folding rack.

In one embodiment of the present application, the first non-bending zone is fixedly connected to one side of the first folding rack, and the second non-bending zone is fixedly connected to one side of the second folding rack, and there is a gap on one side of the pivotal position between the dynamic bending zone and the first folding rack and the second folding rack.

In one embodiment of the present application, the supporting plate is arranged on one side of the first folding rack and the second folding rack, and one end of the supporting plate wraps around an end of the first folding rack away from the second folding rack, and extends to cover an other side of the first folding rack.

In one embodiment of the present application, the foldable display device further comprises an adhesive layer arranged on both sides of the supporting plate, and the first non-bending zone of the flexible display panel is fixedly connected to the one side of the first folding rack by the adhesive layer, and the second non-bending zone is fixedly connected to the one side of the second folding rack by the adhesive layer, and the first static bending zone of the flexible display panel is fixedly connected to the end of the first folding rack away from the second folding rack by the adhesive layer, and the third non-bending zone is fixedly connected to the other side of the first folding rack by the adhesive layer.

The flexible display panel comprises a fourth non-bending zone and a second static bending zone, and the fourth non-bending zone extends to cover an other side of the second folding rack, and the second static bending zone is located between the second non-bending zone and the fourth non-bending zone, and the second static bending zone wraps around an end of the second folding rack away from the first folding rack.

In one embodiment of the present application, the flexible display panel comprises a control module, and the flexible display panel comprises a terminal bending zone, and the terminal bending zone is located at an end of the third non-bending zone away from the first non-bending zone or at an end of the second non-bending zone away from the first non-bending zone, and the control module is arranged in the terminal bending zone.

In one embodiment of the present application, after the first folding rack and the second folding rack are folded, the control module activates a part of the flexible display panel arranged on the other side of the first folding rack to display, and the control module deactivates a part of the flexible display panel arranged on the one side of the first folding rack and the second folding rack; after the first folding rack and the second folding rack are unfolded, the control module deactivates the part of the flexible display panel arranged on the other side of the first folding rack, and the control module activates the part of the flexible display panel arranged on the one side of the first folding rack and the second folding rack to display.

In one embodiment of the present application, a part of the flexible display panel arranged on the one side of the first folding rack and the second folding rack is a dynamic display zone, and a part of the flexible display panel arranged on the other side of the first folding rack is a static display zone.

In one embodiment of the present application, the dynamic display zone is employed for displaying pictures; and the static display zone is employed for displaying time or numbers.

In the present application, one flexible display panel is employed in a foldable display device, and the main screen and the secondary screen are integrated as one through the corresponding mechanism design. Accordingly, it replaces the secondary screen in the prior art for saving costs, while reducing the overall thickness of the mobile phone, to enhance the thinness and portability of the foldable display device, and to solve the problem of the inconsistent aspect ratio of the secondary screen in the prior art.

DETAILED DESCRIPTION OF PREFERRED EMBODIMENTS

For making the aforesaid and other objectives, features and advantages of the present application more comprehensible, preferred embodiments of the present application will be specifically cited in conjunction with the accompanying drawings and described in detail as follows. Furthermore, the directional terms mentioned in the present application, such as up, down, top, bottom, front, rear, left, right, inside, outside, lateral side, surrounding, central, horizontal, transverse, vertical, longitudinal, axial, radial, uppermost layer or lowermost layer, etc., are only the directions of reference to the attached drawings. Thus, the used directional terms are used to describe and understand the present application, but the present invention is not limited thereto.

In the figure, units with similar structures are denoted by the same reference numerals.

Figure 1:
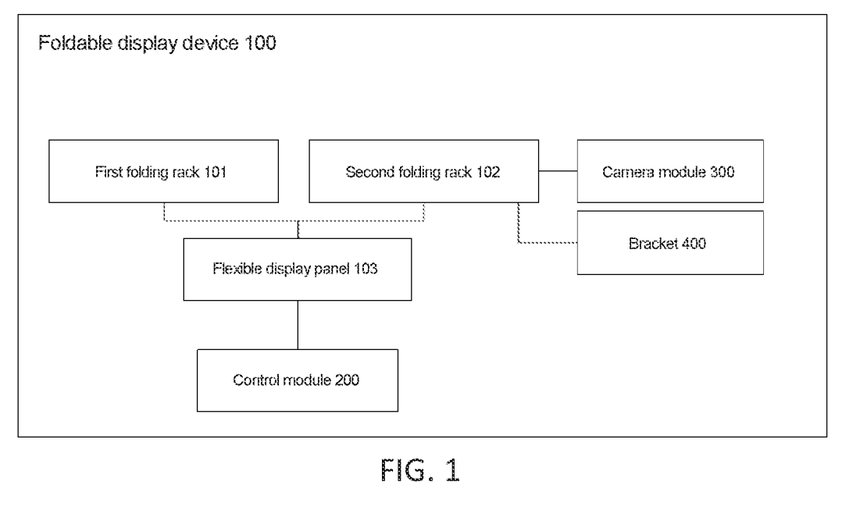
FIG. 1 is a schematic diagram of the foldable display device of the present application.
Figure 2:
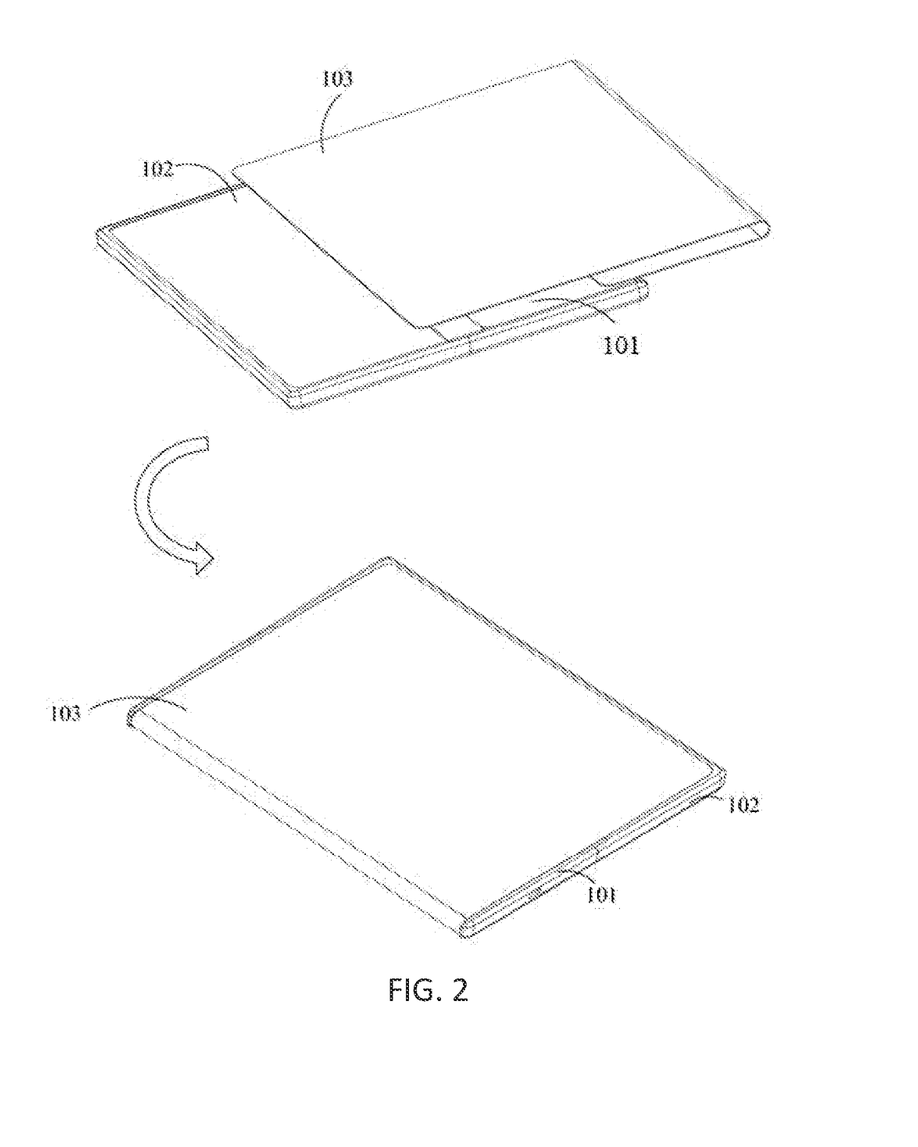
FIG. 2 is a assembly diagram of the foldable display device of the present application.
Figure 3:
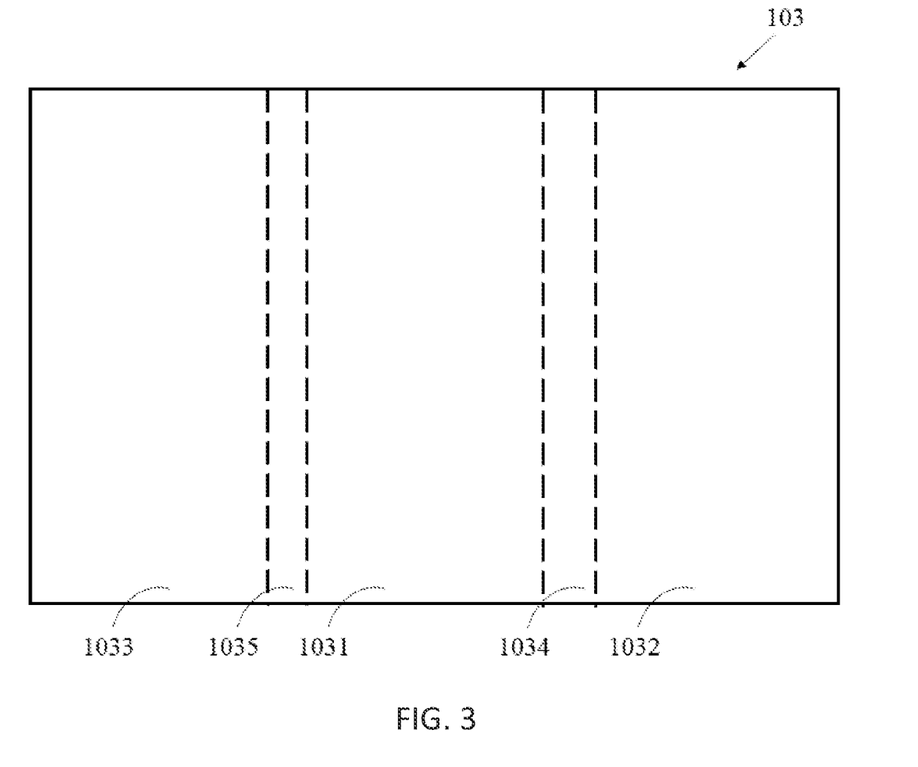
FIG. 3 is a first schematic diagram of the flexible display panel of the present application.

As shown in FIG. 1, the present application provides a foldable display device 100. The foldable display device 100 comprises a first folding rack 101, a second folding rack 102 and a flexible display panel 103. The foldable display device 100 may be a foldable display device, such as a mobile phone or a foldable screen. The foldable display device 100 comprises a control module 200. The control module 200 is arranged in the flexible display panel 103 to control the flexible display panel 103.

As shown in FIG. 2 to FIG. 12, the second folding rack 102 is pivotally connected to the first folding rack 101. In one embodiment, the foldable display device 100 may further comprise a pivoting element 104. The pivoting element 104 can be arranged between the first folding rack 101 and the second folding rack 102. The pivoting element 104 may comprise one or more of a connecting shaft, a hinge and a gear, and is not limited.

The flexible display panel 103 is arranged on the first folding rack 101 and the second folding rack 102. Furthermore, the flexible display panel 103 is arranged on one side of the first folding rack 101 and the second folding rack 102, and one end of the flexible display panel 103 wraps around an end of the first folding rack 101 away from the second folding rack, and extends to cover an other side of the first folding rack 101.

Specifically, as shown in FIG. 2 to FIG. 12, the flexible display panel 103 covers the first inner surface of the first folding rack 101, the second inner surface of the second folding rack 102 and the first outer surface of the first folding rack 101. In one embodiment, the flexible display panel 103 can be a flexible organic light emitting diode (OLED) screen, but is not limited thereto. For instance, the flexible display panel 103 may also be a flexible quantum dot light emitting diode (QLED) screen.

As shown in FIG. 3 to FIG. 8, the flexible display panel 103 of the present application comprises a first non-bending zone 1031, a second non-bending zone 1032, a third non-bending zone 1033, a first static bending zone 1035 and a dynamic bending zone 1034.

The first non-bending zone 1031 is fixedly connected to one side of the first folding rack 101, and the second non-bending zone 1032 is fixedly connected to one side of the second folding rack 102, and there is a gap on one side of the pivotal position between the dynamic bending zone 1034 and the first folding rack 101 and the second folding rack 102.

Besides, the first non-bending zone 1031 and the second non-bending zone 1032 cover the one side of the first folding rack 101 and the second folding rack 102, and the third non-bending zone 1033 extends to cover the other side of the first folding rack 101. Specifically, the first non-bending zone 1031, the second non-bending zone 1032 and the third non-bending zone 1033 respectively cover the first inner surface of the first folding rack 101, the second inner surface of the second folding rack 102 and the first outer surface of the first folding rack 101.

The first static bending zone 1035 covers the end of the first folding rack 101 away from the second folding rack 102. The dynamic bending zone 1034 is arranged corresponding to a pivotal position between the first folding rack 101 and the second folding rack 102. For instance, the dynamic bending zone 1034 covers the pivotal position between the first folding rack 101 and the second folding rack 102. Furthermore, the first static bending zone 1035 of the flexible display panel is fixedly connected to the end of the first folding rack 101 away from the second folding rack 102, and the dynamic bending zone 1034 can be repeatedly bent 200,000 times.

Figure 5:
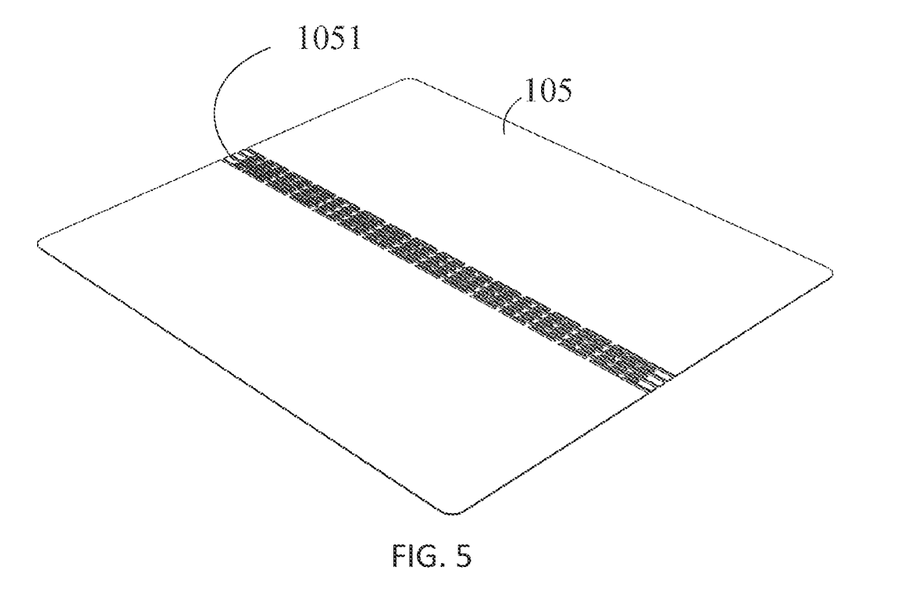
FIG. 5 is a schematic diagram of the supporting plate of the foldable display device of the present application.
Figure 6:
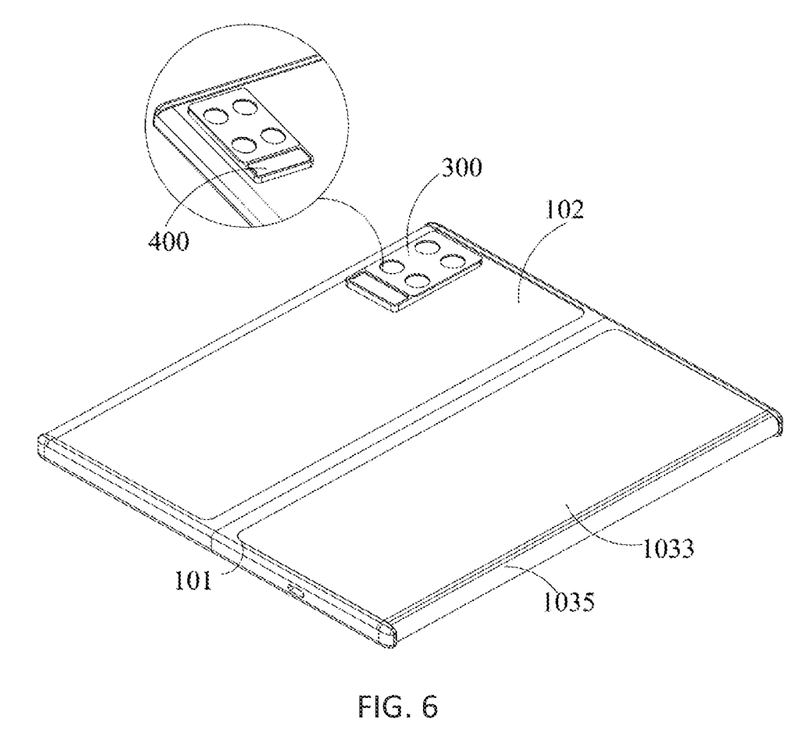
FIG. 6 is a second schematic diagram of the foldable display device of the present application after unfolding.
Figure 7:
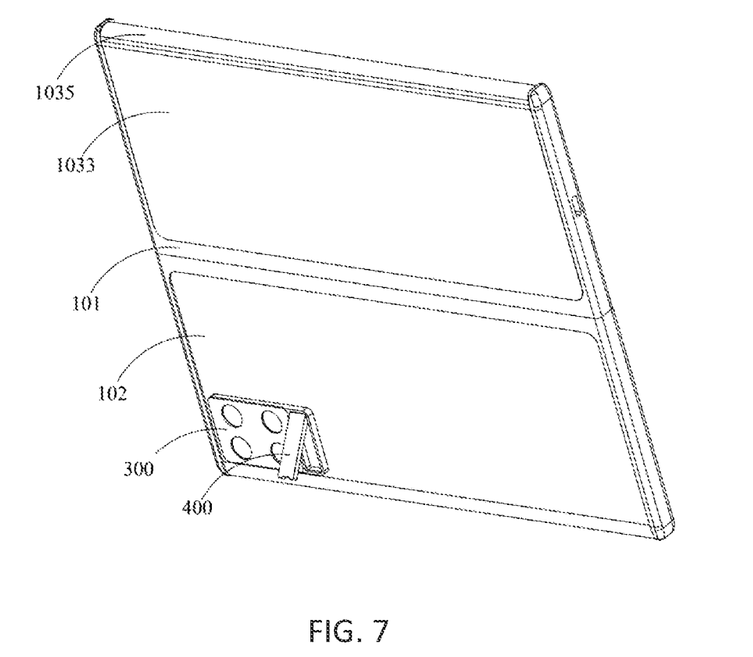
FIG. 7 is a third schematic diagram of the foldable display device of the present application after unfolding.
Figure 8:
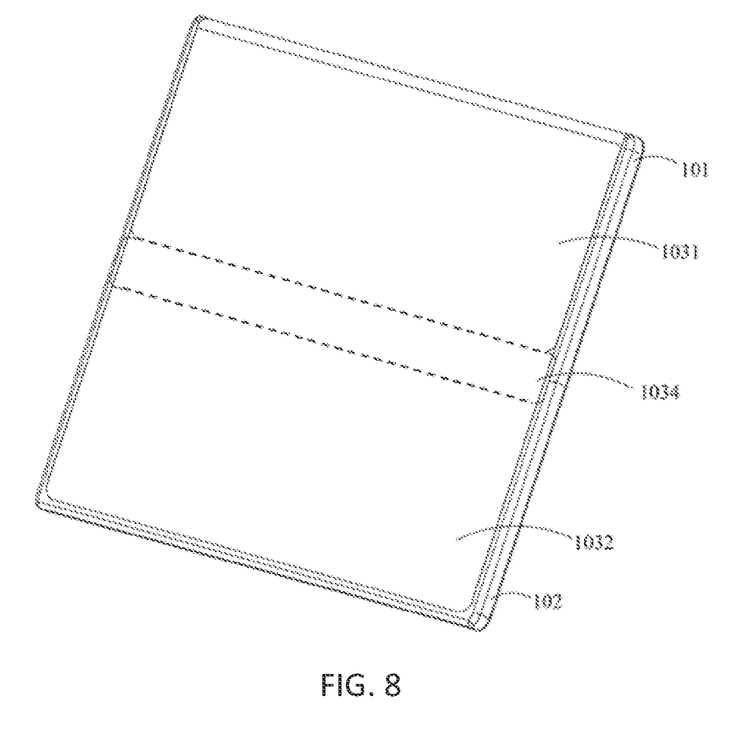
FIG. 8 is a fourth schematic diagram of the foldable display device of the present application after unfolding.
Figure 9:
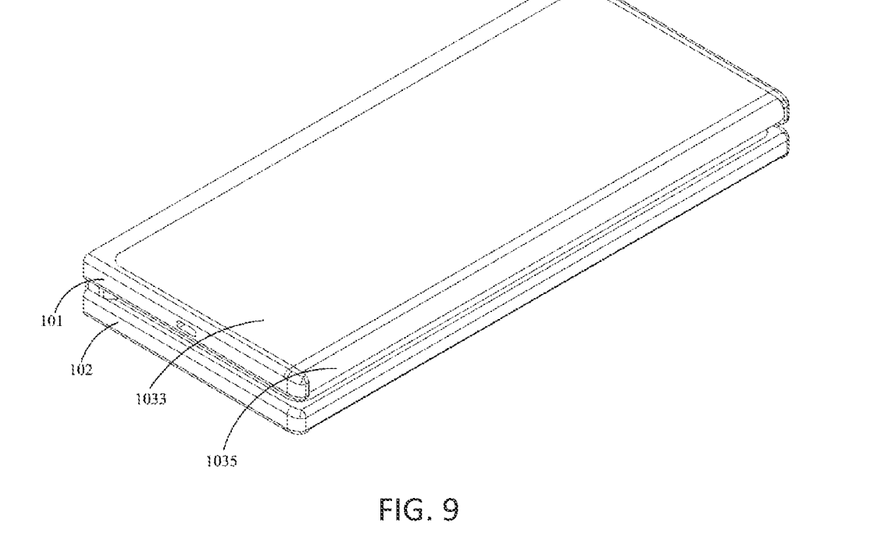
FIG. 9 is a first schematic diagram of the foldable display device of the present application after folding.
Figure 10:
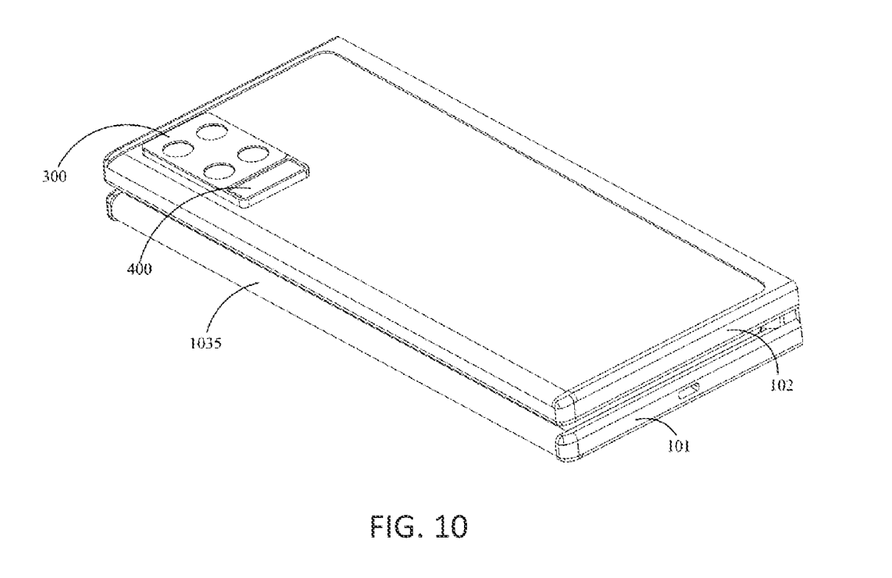
FIG. 10 is a second schematic diagram of the foldable display device of the present application after folding.
Figure 11:
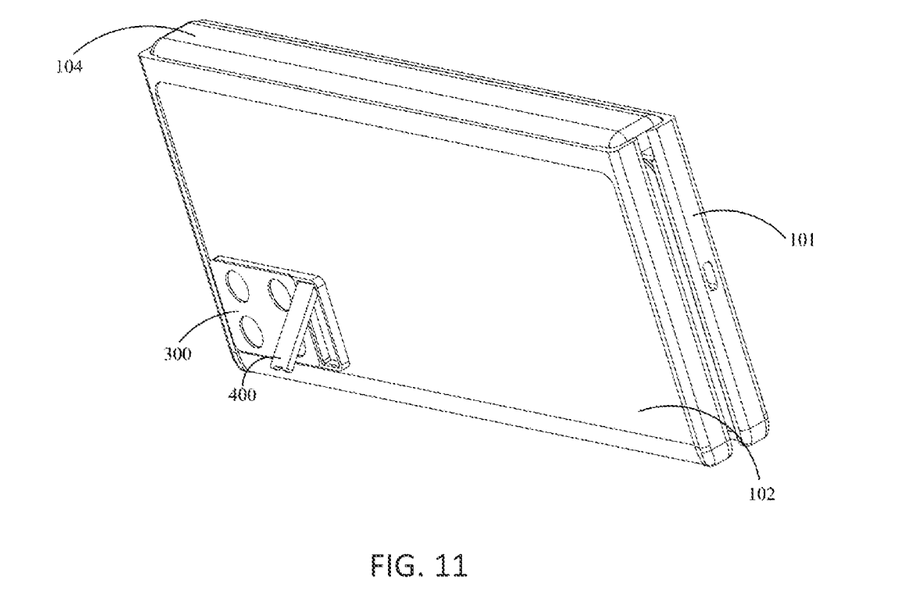
FIG. 11 is a third schematic diagram of the foldable display device of the present application after folding.
Figure 12:
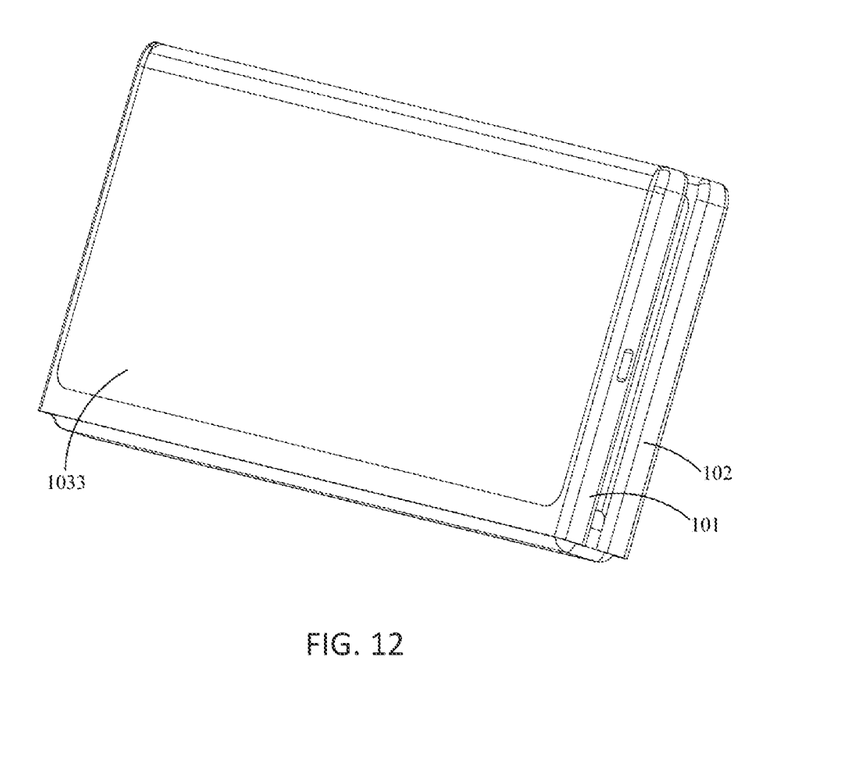
FIG. 12 is a fourth schematic diagram of the foldable display device of the present application after folding.

In one embodiment, the foldable display device 100 further comprises a supporting plate 105. The supporting plate 105 comprises a bending structure 1051 to facilitate bending. The bending structure 1051 is arranged corresponding to the dynamic bending zone 1034 of the flexible display panel 103. The supporting plate 105 is arranged on one side of the flexible display panel 103 close to the first folding rack 101 and the second folding rack 102, and is fixedly connected to the flexible display panel. Besides, the first non-bending zone 1031 and the second non-bending zone 1032 cover the supporting plate 105.

Moreover, the supporting plate 105 is arranged on the one side of the first folding rack 101 and the second folding rack 102, and one end of the support plate 105 wraps around the end of the first folding rack 101 away from the second folding rack 102, and extends to cover the other side of the first folding rack 101.

Specifically, the supporting plate 105 can be a plate made of stainless steel, and the bending structure 1051 can be a mesh structure formed on the supporting plate 105 through a patterning process or other processes, and is not limited.

The supporting plate 105 may also be made of one or more of composite materials, flexible materials and rigid materials.

Figure 4:
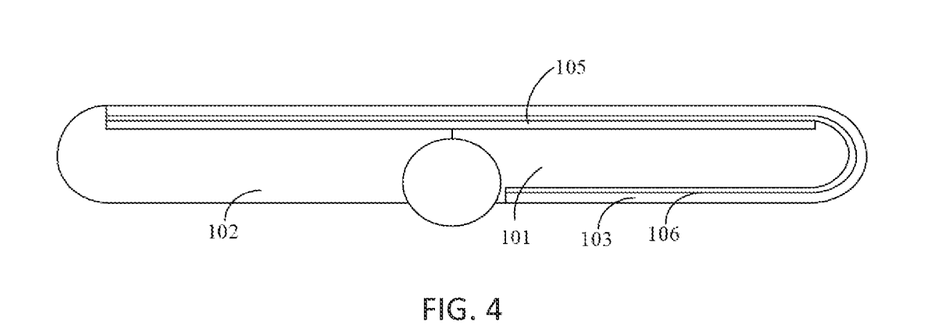
FIG. 4 is a first schematic diagram of the foldable display device of the present application after unfolding.

In one embodiment, as shown in FIG. 4, the foldable display device 100 further comprises an adhesive layer 106. The adhesive layer 106 is arranged on both sides of the supporting plate 105. The flexible display panel 103 is adhered on the adhesive layer 106. The first non-bending zone 1031 of the flexible display panel 103 is fixedly connected to the one side of the first folding rack 101 by the adhesive layer 106, and the second non-bending zone 1032 is fixedly connected to the one side of the second folding rack 102 by the adhesive layer 106, and the first static bending zone 1035 of the flexible display panel 103 is fixedly connected to the end of the first folding rack 101 away from the second folding rack 102 by the adhesive layer 106, and the third non-bending zone 1033 is fixedly connected to the other side of the first folding rack 101 by the adhesive layer 106.

Specifically, the adhesive layer 106 may comprise elastic glue. During production, the third non-bending zone 1033 and the first static bending zone 1035 can be fixed and adhered by the elastic glue. After the third non-bending zone 1033 and the first static bending zone 1035 are fixed, the other parts of the flexible display panel 103 can be reversely bent 180 degrees, and then the dynamic bending zone 1034, the first non-bending zone 1031 and the second non-bending zone 1032 are attached and fixed.

In one embodiment, the part of the flexible display panel 103 provided on the one side of the first folding rack 101 and the second folding rack 102 is a dynamic display zone. Specifically, the part of the flexible display panel 103 covering the first inner surface of the first folding rack 101, the second inner surface of the second folding rack 102 is the dynamic display zone.

In one embodiment, the part of the flexible display panel 103 provided on the other side of the first folding rack 101 is a static display zone. Specifically, the part of the flexible display panel 103 provided on the first outer surface of the first folding rack 101 is the static display zone. Specifically, the first non-bending zone 1031, the second non-bending zone 1032 and the dynamic bending zone 1034 are the dynamic display zone. The third non-bending zone 1033 and the first static bending zone 1035 are the static display zone. Furthermore, the dynamic display zone can display images, such as pictures and operating interfaces, while the static display zone can display images of time and numbers.

Furthermore, as shown in FIG. 9 to FIG. 12, when the first folding rack 101 and the second folding rack 102 are folded to each other, the first folding rack 101 and the second folding rack 102 are close to each other. Specifically, when the first folding rack 101 and the second folding rack 102 are folded to each other, the first inner surface of the first folding rack 101 and the second inner surface of the second folding rack 102 are close to each other.

Figure 13:
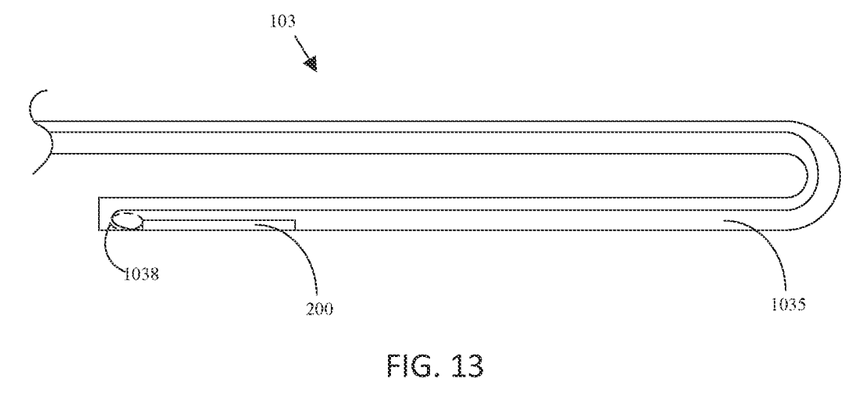
FIG. 13 is a first schematic diagram of the terminal bending zone of the foldable display device of the present application.
Figure 14:
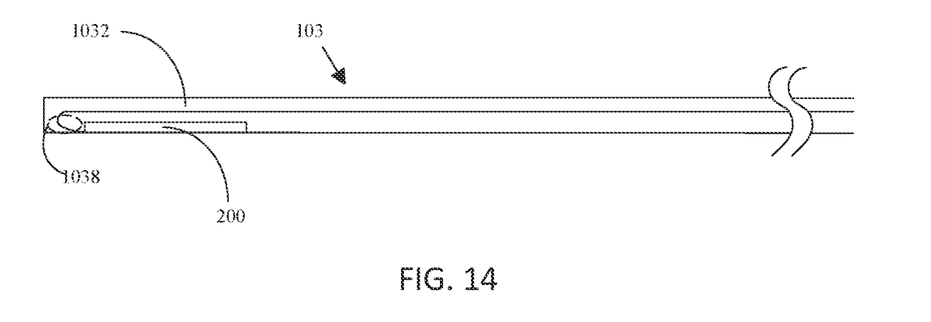
FIG. 14 is a second schematic diagram of the terminal bending zone of the foldable display device of the present application.

In one embodiment, as shown in FIG. 13 to FIG. 14, the terminal bending zone 1038 is defined in the flexible display panel 103. The terminal bending zone 1038 can be located at an end of the third non-bending zone 1033 away from the first non-bending zone 1031 as shown in FIG. 13 or at an end of the second non-bending zone 1032 away from the first non-bending zone 1031, and the control module 200 can be arranged in the terminal bending zone 1038 to control the flexible display panel 103.

In one embodiment, after the first folding rack 101 and the second folding rack 102 are folded, the control module 200 activates a part of the flexible display panel 103 arranged on the other side of the first folding rack 101 to display, and the control module 200 deactivates a part of the flexible display panel 103 arranged on the one side of the first folding rack 101 and the second folding rack 102; after the first folding rack 101 and the second folding rack 102 are unfolded, the control module 200 deactivates the part of the flexible display panel 103 arranged on the other side of the first folding rack 101, and the control module 200 activates the part of the flexible display panel arranged on the one side of the first folding rack 101 and the second folding rack 102 to display.

Specifically, after the first folding rack 101 and the second folding rack 102 are folded, the control module 200 activates the part of the flexible display panel 103 covering the first outer surface to display, and the control module 200 deactivates the part of the flexible display panel 103 covering the first inner surface of the first folding rack 101 and the second inner surface of the second folding rack 102. After the first folding rack 101 and the second folding rack 102 are unfolded, the control module 200 deactivates the part of the flexible display panel 103 covering the first outer surface, and the control module 200 activates the part of the flexible display panel 103 covering the first inner surface of the first folding rack 101 and the second inner surface of the second folding rack 102 to display.

Specifically, after the first folding rack 101 and the second folding rack 102 are folded, the control module 200 controls the third non-bending zone 1033 and the first static bending zone 1035 to display, and the control module 200 controls the first non-bending zone 1031, the second non-bending zone 1032 and the dynamic bending zone 1034 to be turned off; after the first folding rack 101 and the second folding rack 102 are unfolded, the control module 200 controls the third non-bending zone 1033 and the first static bending zone 1035 to be turned off, and the control module 200 controls the first non-bending zone 1031, the second non-bending zone 1032 and the dynamic bending zone 1034 to display.

In one embodiment, the control module 200 can control the first non-bending zone 1031, the second non-bending zone 1032 and the dynamic bending zone 1034 to perform dynamic display; the control module 200 can control the third non-bending zone 1033 and the first static bending zone 1035 to perform static display, but is not limited thereto.

In another embodiment, the control module 200 can control the first non-bending zone 1031, the second non-bending zone 1032, the dynamic bending zone 1034, the third non-bending zone 1033 and the first static bending zone 1035 to perform dynamic display.

In one embodiment, the control module 200 can comprise a control chip to control the first non-bending zone 1031, the second non-bending zone 1032, the dynamic bending zone 1034, the third non-bending zone 1033 and the first static bending zone 1035 to perform dynamic display or static display.

In one embodiment, the diagonal length of the third non-bending zone 1033 is 6.67 inches, and the diagonal length of the dynamic display zone formed by the first non-bending zone 1031, the second non-bending zone 1032 and the dynamic bending zone 1034 is 8.01 inches. Through the program-driven control method and the control module 200, when the foldable display device 100 is in the folded state, the static display zone can perform display independently, and the dynamic display zone folded inward is turned off; when the foldable display device 100 is in unfolded, the dynamic display zone folded inward displays independently, and the static display zone is turned off. Therefore, a 6.67-inch static display zone and an 8.01-inch dynamic display zone can be realized.

Besides, in one embodiment, when the foldable display device 100 is in unfolded, only the dynamic display zone display independently, and the static display zone is in off state. These two modes can be controlled by the control chip of the control module 200 to achieve the effect of power saving.

In detail, the first non-bending zone 1031, the second non-bending zone 1032 and the dynamic bending zone 1034 can be regarded as the main screen, and the third non-bending zone 1033 and the first static bending zone 1035 can be regarded as the secondary screen. When the main screen is in the folded state, the secondary screen is located outside the first folding rack 101. The status of the main screen and the secondary screen can be switched by the display driver. For example, when the main screen is in the folded state, the main screen may be in the off state, and the secondary screen may be in the display state.

In one embodiment, a camera module 300 can be arranged on the second outer surface of the second folding rack 102 to realize functions such as photographing and video recording, but it is not limited thereto. In other embodiments, the camera module 300 can be arranged on the inner surface of the first folding rack 101 or the second folding rack 102, and can be arranged according to actual requirements.

In one embodiment, as shown in FIG. 6 to FIG. 12, the foldable display device 100 of the present application may comprise a bracket 400. The bracket 400 is arranged on the second outer surface of the second folding rack 102. The bracket 400 is an adjusting bracket which is rotatable and retractable. The bracket 400 can be arranged adjacent to the camera module 300. In addition, the bracket 400 may be made of a long strip of magnesium-aluminum alloy, so that the bracket 400 is easy to deploy and possesses a durable property. The bracket 400 can be connected to the camera module 300 through a rotating shaft. When the foldable display device 100 of the present application is unfolded or folded, the bracket 400 enables the foldable display device 100 to be set at various angles without using other auxiliary brackets, which is convenient for users to use and operate, and improves the convenience of use of the overall device.

In this embodiment, when the foldable display device 100 is unfolded or folded, the control module 200 of the present application can control the display of the flexible display panel 103, which can be adjusted according to requirements. For instance, when the foldable display device 100 is folded and supported by the bracket 400, the control module 200 can control the third non-bending zone 1033 and the first static bending zone 1035 to perform static display or dynamic display; when the foldable display device 100 is unfolded and supported by the bracket 400, the control module 200 can control the first non-bending zone 1031, the second non-bending zone 1032, the dynamic bending zone 1034, the third non-bending zone 1033 and the first static bending zone 1035 for static display or dynamic display. It can be determined according to actual requirements, and there is no limitation.

Figure 15:
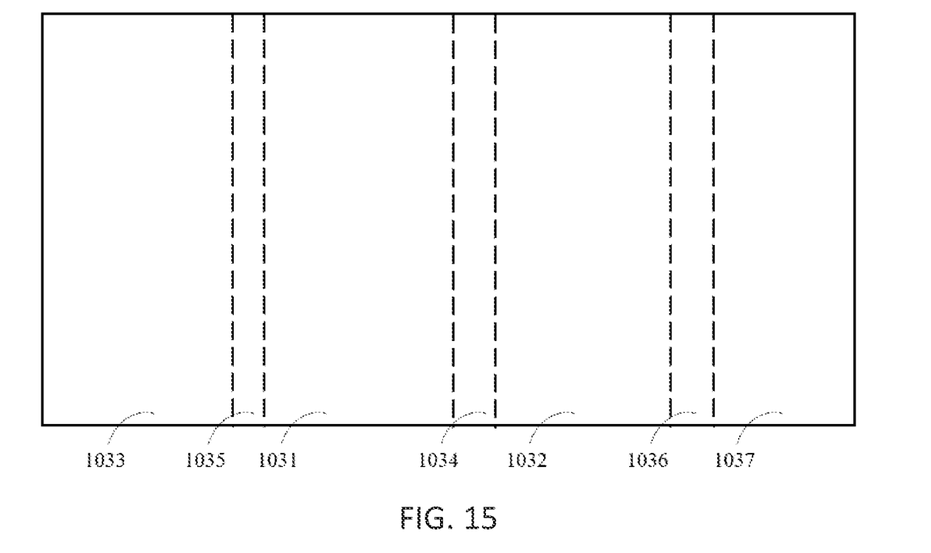
FIG. 15 is a second schematic diagram of the flexible display panel of the present application.
Figure 16:
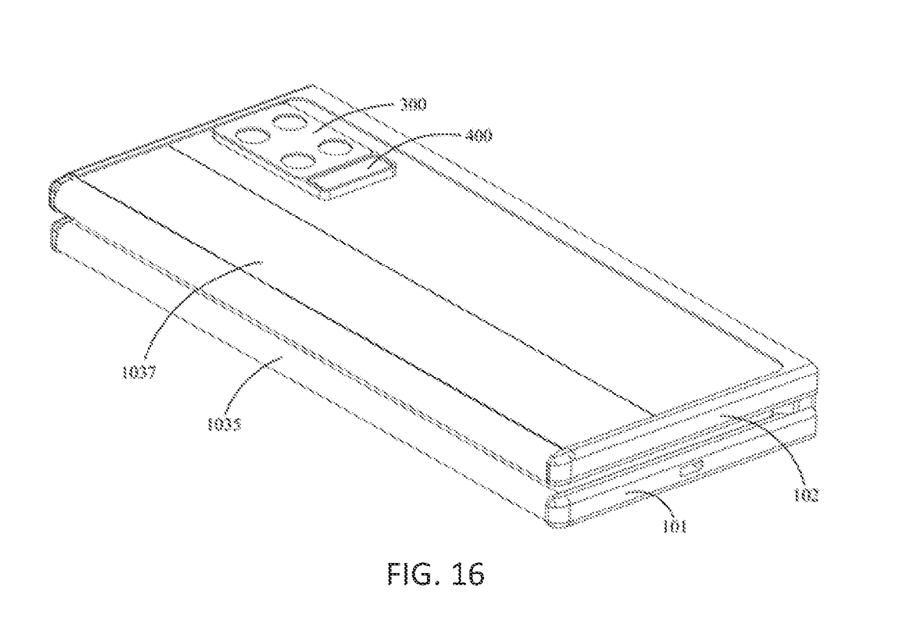
FIG. 16 is a fifth schematic diagram of the foldable display device of the present application after folding.

In another embodiment, as shown in FIG. 15 and FIG. 16, a fourth non-bending zone 1036 and a second static bending zone 1037 are defined on the flexible display panel 103. The fourth non-bending zone 1036 extends to cover the other side of the second folding rack 102, and the second static bending zone 1037 is located between the second non-bending zone 1032 and the fourth non-bending zone 1036. The second static bending zone 1037 wraps around an end of the second folding rack 102 away from the first folding rack 101. Specifically, the fourth non-bending zone 1036 covers the second outer surface of the second folding rack 102; the second static bending zone 1037 is located between the second non-bending zone 1032 and the fourth non-bending zone 1036; the second static bending zone 1037 covers the second side surface between the second inner surface and the second outer surface of the second folding rack 102. The area of the flexible display panel 103 in this embodiment is larger than the area of the flexible display panel 103 in the foregoing embodiment. Therefore, after the first folding rack 101 and the second folding rack 102 are folded, the static display zone possesses a larger area, which can provide more display options.

In conclusion, in the foldable display device provided by the present application, one flexible display panel is employed in a foldable display device, and the main screen and the secondary screen are integrated as one through the corresponding mechanism design. Accordingly, it replaces the secondary screen in the prior art for saving costs, while reducing the overall thickness of the mobile phone, to enhance the thinness and portability of the foldable display device, and to solve the problem of the inconsistent aspect ratio of the secondary screen in the prior art.

Although the present application has been shown and described with one or more implementations, those skilled in the art will derive equivalent variations and modifications based on the reading and understanding of the specification and the drawings. The present application comprises all such modifications and variations, and is limited only by the scope of the appended claims. Especially with regard to the various functions performed by the aforesaid components, the terms used to describe such components are intended to correspond to any component (unless indicated otherwise) that performs the specified function of the component (for example, it is functionally equivalent), even if the structure is not equivalent to the disclosed structure that performs the functions in the exemplary implementation of the present specification shown herein. Besides, a specific feature of the present specification has been disclosed with respect to only one of several implementations, but this feature can be combined with one or more other features as can be desired and advantageous for other implementations for a given or specific application. Moreover, as far as the terms "including", "having", "containing" or their variants are used in specific embodiments or claims, such terms are intended to be included in a similar manner to the term "comprising".

Above are only preferred embodiments of the present application, the scope of the present application is not limited to this, and to any persons who are skilled in the art, change or replacement which is easily derived should be covered by the protected scope of the application. Thus, the protected scope of the application should go by the subject claims.

What is claimed is:

1. A foldable display device, comprising:
   a first folding rack, and
   a second folding rack, pivotally connected with the first folding rack; and
   a flexible display panel, arranged on one side of the first folding rack and the second folding rack, and one end of the flexible display panel wraps around an end of the first folding rack away from the second folding rack, and extends to cover an other side of the first folding rack,
   wherein the flexible display panel comprises a first static bending zone and a dynamic bending zone, and the first static bending zone covers the end of the first folding rack away from the second folding rack; the dynamic bending zone is arranged corresponding to a pivotal position between the first folding rack and the second folding rack.

2. The foldable display device according to claim 1, wherein the first static bending zone of the flexible display panel is fixedly connected to the end of the first folding rack away from the second folding rack.

3. The foldable display device according to claim 2, wherein the flexible display panel comprises a first non-bending zone, a second non-bending zone and a third non-bending zone; the first non-bending zone and the second non-bending zone cover the one side of the first folding rack and the second folding rack, and the third non-bending zone extends to cover the other side of the first folding rack.

4. The foldable display device according to claim 3, wherein the first non-bending zone is fixedly connected to one side of the first folding rack, and the second non-bending zone is fixedly connected to one side of the second folding rack, and there is a gap on one side of the pivotal position between the dynamic bending zone and the first folding rack and the second folding rack.

5. The foldable display device according to claim 3, wherein the flexible display panel comprises a fourth non-bending zone and a second static bending zone, and the fourth non-bending zone extends to cover an other side of the second folding rack, and the second static bending zone is located between the second non-bending zone and the fourth non-bending zone, and the second static bending zone wraps around an end of the second folding rack away from the first folding rack.

6. The foldable display device according to claim 3, wherein the foldable display device comprises a control module,
and the flexible display panel comprises a terminal bending zone, and the terminal bending zone is located at an end of the third non-bending zone away from the first non-bending zone or at an end of the second non-bending zone away from the first non-bending zone, and the control module is arranged in the terminal bending zone.

7. The foldable display device according to claim 6, wherein after the first folding rack and the second folding rack are folded, the control module activates a part of the flexible display panel arranged on the other side of the first folding rack to display, and the control module deactivates a part of the flexible display panel arranged on the one side of the first folding rack and the second folding rack; after the first folding rack and the second folding rack are unfolded, the control module deactivates the part of the flexible display panel arranged on the other side of the first folding rack, and the control module activates the part of the flexible display panel arranged on the one side of the first folding rack and the second folding rack to display.

8. The foldable display device according to claim 6, wherein the control module controls the first non-bending zone, the second non-bending zone, the dynamic bending zone, the third non-bending zone and the first static bending zone to perform dynamic display or static display.

9. The foldable display device according to claim 8, wherein the first non-bending zone, the second non-bending zone and the dynamic bending zone are dynamic display zones for displaying pictures; the third non-bending zone and the first static bending zone are static display zones for displaying time or numbers.

10. A foldable display device, comprising:
a first folding rack,
a second folding rack, pivotally connected with the first folding rack;
a flexible display panel, arranged on one side of the first folding rack and the second folding rack, and one end of the flexible display panel wraps around an end of the first folding rack away from the second folding rack, and extends to cover an other side of the first folding rack; wherein the flexible display panel comprises a first static bending zone and a dynamic bending zone, and the first static bending zone covers the end of the first folding rack away from the second folding rack; the dynamic bending zone is arranged corresponding to a pivotal position between the first folding rack and the second folding rack; and
a supporting plate, comprising a bending structure corresponding to the dynamic bending zone of the flexible display panel, and the supporting plate is arranged on a side of the flexible display panel close to the first folding rack and the second folding rack, and is fixedly connected to the flexible display panel.

11. The foldable display device according to claim 10, wherein the first static bending zone of the flexible display panel is fixedly connected to the end of the first folding rack away from the second folding rack.

12. The foldable display device according to claim 11, wherein the flexible display panel comprises a first non-bending zone, a second non-bending zone and a third non-bending zone; the first non-bending zone and the second non-bending zone cover the one side of the first folding rack and the second folding rack, and the third non-bending zone extends to cover the other side of the first folding rack.

13. The foldable display device according to claim 12, wherein the first non-bending zone is fixedly connected to one side of the first folding rack, and the second non-bending zone is fixedly connected to one side of the second folding rack, and there is a gap on one side of the pivotal position between the dynamic bending zone and the first folding rack and the second folding rack.

14. The foldable display device according to claim 12, wherein the flexible display panel comprises a fourth non-bending zone and a second static bending zone, and the fourth non-bending zone extends to cover an other side of the second folding rack, and the second static bending zone is located between the second non-bending zone and the fourth non-bending zone, and the second static bending zone wraps around an end of the second folding rack away from the first folding rack.

15. The foldable display device according to claim 12, wherein the foldable display device comprises a control module,
and the flexible display panel comprises a terminal bending zone, and the terminal bending zone is located at an end of the third non-bending zone away from the first non-bending zone or at an end of the second non-bending zone away from the first non-bending zone, and the control module is arranged in the terminal bending zone.

16. The foldable display device according to claim 15, wherein after the first folding rack and the second folding rack are folded, the control module activates a part of the flexible display panel arranged on the other side of the first folding rack to display, and the control module deactivates a part of the flexible display panel arranged on the one side of the first folding rack and the second folding rack; after the first folding rack and the second folding rack are unfolded, the control module deactivates the part of the flexible display panel arranged on the other side of the first folding rack, and the control module activates the part of the flexible display panel arranged on the one side of the first folding rack and the second folding rack to display.

17. The foldable display device according to claim 10, wherein the supporting plate is arranged on the one side of the first folding rack and the second folding rack, and one end of the support plate wraps around the end of the first folding rack away from the second folding rack, and extends to cover the other side of the first folding rack.

18. The foldable display device according to claim 17, wherein the foldable display device further comprises an adhesive layer arranged on both sides of the supporting plate, and
    the first non-bending zone of the flexible display panel is fixedly connected to the one side of the first folding rack by the adhesive layer, and the second non-bending zone is fixedly connected to the one side of the second folding rack by the adhesive layer, and the first static bending zone of the flexible display panel is fixedly connected to the end of the first folding rack away from the second folding rack by the adhesive layer, and the third non-bending zone is fixedly connected to the other side of the first folding rack by the adhesive layer.

19. The foldable display device according to claim 10, wherein a part of the flexible display panel arranged on the one side of the first folding rack and the second folding rack is a dynamic display zone, and a part of the flexible display panel arranged on the other side of the first folding rack is a static display zone.

20. The foldable display device according to claim 19, wherein the dynamic display zone is employed for displaying pictures; and the static display zone is employed for displaying time or numbers.

* * * * *